United States Patent [19]

Curtis et al.

[11] Patent Number: 4,591,840

[45] Date of Patent: May 27, 1986

[54] CALENDAR EVENT DESCRIPTION ABBREVIATION

[75] Inventors: Donald E. Curtis, Garland; James P. Vincent, Arlington; Mary E. Weidmann, Irving, all of Tex.

[73] Assignee: International Business Machines Corp., Armonk, N.Y.

[21] Appl. No.: 548,608

[22] Filed: Nov. 4, 1983

[51] Int. Cl.[4] .............................................. G09G 3/04
[52] U.S. Cl. ..................................... 340/706; 40/107; 340/700
[58] Field of Search ............... 340/700, 706, 711, 716; 364/401, 402, 407; 40/107; 238/2, 3, 4; 368/41, 10, 82

[56] References Cited

U.S. PATENT DOCUMENTS

| | | | |
|---|---|---|---|
| 1,898,137 | 2/1933 | Neely | 40/107 |
| 3,233,401 | 2/1966 | Hoffman | 368/41 |
| 3,526,982 | 9/1970 | Hess | 40/107 |
| 3,964,195 | 6/1976 | Jordan | 40/107 |
| 4,282,824 | 8/1981 | Lafferty | 40/107 |
| 4,415,271 | 11/1983 | Mori | 368/41 |
| 4,485,463 | 11/1984 | Kita | 368/41 |

OTHER PUBLICATIONS

Exhibit A: Standard Calender Format.

*Primary Examiner*—John W. Caldwell, Sr.
*Assistant Examiner*—Michael F. Heim
*Attorney, Agent, or Firm*—C. Lamont Whitham; James H. Barksdale; John L. Jackson

[57] ABSTRACT

A method of building a monthly calendar screen having abbreviated event descriptions directly translated from event descriptions on day screens. Day screens are built from keyed in dates, times, and descriptions of events related to the dates and times. Monthly screens are built by combining and abbreviating corresponding day screens. Keying and coding during day screen building, and processing steps during monthly screen building are reduced by positionally locating the first characters of day screen event descriptions, time-wise, within the monthly screens.

6 Claims, 4 Drawing Figures

```
Schedule for: G. J. Johnson         LOOK AT THE WHOLE MONTH   Date: 07 / 19 / 83
       Sunday  |  Monday  |  Tuesday  |  Wednesday  |  Thursday  |  Friday  |  Saturday
+-------+-------+-------+-------+-------+-------+-------+
|       |   4   |   5   |   6   |   7   |   1   |   2   |
|       |       |       |       |       | MM..I..| ...L..M.|
|   3   |       | <MM...| ..I...| MMM...|       |       |
|...... |.......|.......|.......|.......|.......|.......|
+-------+-------+-------+-------+-------+-------+-------+
|  10   |  11   |  12   |  13   |  14   |  8    |  9    |
|       | -D...MM| .x.....| .G**W.| ...I..|       | ...>  |
|.......|.......|.......|.......|.......|.......|.......|
+-------+-------+-------+-------+-------+-------+-------+
|  17   |  18   |  19   |  20   |  21   |  15   |  16   |
|       | ..F...| <D-.L*CC| ......D>| .S..I..|       | ...m. |
|.......|.......|.......|.......|.......|.......|.......|
+-------+-------+-------+-------+-------+-------+-------+
|  24   |  25   |  26   |  27   |  28   |  22   |  23   |
|       | .D..RS.| .D..MMM.| III...| ..--..| ..BBB.|       |
|.......|.......|.......|.......|.......|.......|.......|
+-------+-------+-------+-------+-------+-------+-------+
|  31   |       |       |       |       |  29   |  30   |
|<VVVVV.|       |       |       |       |       | ...VVVV>|
+-------+-------+-------+-------+-------+-------+-------+
PF1 Look at the Day  PF2 Schedules  PF3 Rooms    PF4 Next Day    PF5 Previous Day
PF7 Groups  PF8 Print  PF9 Help  PF10 Next Month  PF11 Prev. Month  PF12 Return
```

FIG. 1

```
1....+...10....+...20....+...30....+...40....+...50....+...60....+...70....+...80
Schedule for: G. J. Johnson      LOOK AT OR CHANGE THE SCHEDULE
                                         Date: 07 / 19 / 83 , Tuesday BEGIN   END     DESCRIPTION
7:30AM  9:00AM  PERS: Counseling session with Bill
9:00AM  10:00AM Department meeting-Wilson's office
                Bring figures for August.
10:00AM 11:00AM CONF: Review new system with John
12:00PM 1:30PM  Lunch with Pat
1:30PM  4:00PM  Class PF1 Move PF2 Copy PF3 Quit PF4 Next PF5 Prev. PF6 Month PF9 Help PF12 Return
1....+...10....+...20....+...30....+...40....+...50....+...60....+...70....+...80
```

FIG. 2

CALENDAR EVENT DESCRIPTION ABBREVIATION

CROSS-REFERENCE TO RELATED APPLICATIONS

U.S. patent application Ser. No. 487,375, filed Apr. 21, 1983, entitled ANNOTATED CALENDAR ASSEMBLY, and having J. P. Vincent et al. as inventors.

U.S. patent application Ser. No. 548,609, filed Nov. 4, 1983, entitled METHOD OF SCHEDULING MEETINGS, and having D. E. Curtis et al. as inventors.

TECHNICAL FIELD

This invention relates generally to calendaring, and more specifically to building a readily interpretable calendar from non-specially coded event descriptions.

BACKGROUND ART

Calendaring is an old and well known technique of reminding one of coming events. Commonly used is a calendar or diary made up of a number of bound sheets of paper with each face of each sheet forming a page. As such, there is one page per calendar day and the pages are usually time divided. For example, along the left hand margin of each page may be printed times at one hour increments with the first listed time being 9:00 a.m. and the last being 5:00 p.m. This time span would cover working hours of a day. The blank spaces to the right of the printed times are for writing in event descriptions related to the times, such as "Meeting with Bill Jones", "Dentist appointment", etc. Such calendars often have many event descriptions entered therein and serve as a convenient reminder of the next occurring event. Also, available times for scheduling additional events are easily located due to the blank space opposite the available times. However, a somewhat later search for the earlier entered day and time of the "Dentist Appointment" can be time consuming and tedious. Such a search can require leafing through a large number of pages and reading many event descriptions.

With the advent of modern keyboard/display stand alone and host connected terminal work stations, and calendaring application programs, the burden associated with the above described "lost event" problem has been somewhat lessened. Using a calendaring application, a user at a work station can call a day screen for keying in times and event descriptions. Work of others has contemplated the taking of each of the day screens and in turn building a filled-in monthly calendar screen. One embodiment of a month screen includes a lined grid forming boxes or blocks for each day of the month. Based on the month in question, numeric notations are appropriately located in each of the applicable blocks. For example, if the first day of the month in question falls on a Sunday, the Arabic numeral "1" could appear in the upper right hand corner of the upper left hand block of the grid. Other than being displayed on a terminal work station display, the monthly calendar is not distinguishable from monthly grids appearing in commonly available bound calendars or diaries having the grids printed on paper.

In the building of filled in month screens for display, others have contemplated including event description abbreviations within the blocks. Also contemplated has been the time-wise positioning of the abbreviations within the blocks. An example would be the positioning of an "D" in the center of a block and along the bottom border thereof to denote "Dentist appointment" at 12:00 noon. With this arrangement, blank spaces represent times available for scheduling meetings.

As is readily appreciated, the "lost event" problem is now much more manageable. Required is the calling of the filled-in month screen for display and a visual scanning of abbreviations. For each "D" detected, the corresponding day screen can be called to confirm the existence of the appointment.

A number of problems still exist, though. One is the excessive keying and attention necessary to cause the abbreviation to appear on the month screen. Required is the bracketing of a keyed in abbreviation with keyed in symbols or codes in a particular column or field on the day screen. Following keying, a portion of a day screen can appear as:

10:00<M>Meeting with Sam Smith
11:00<M>Meeting with Bill Jones
12:00<D>Dentist appointment Another problem still existing is that on the display screen, the abbreviation location and the time of the event are not always readily correlatable. Practice and a sharp eye may be required to determine that an "M" spaced from the left side of the block by an hour increment denotes a 10:00 a.m. "Meeting with Sam Smith". In like manner, the time of a blank is often subject to estimation.

The invention of this application presents advances over known art or work of others in that a monthly calendar is presented wherein event descriptions themselves are directly abbreviated, and times when no events have been scheduled are set out in a distinctive manner. The advantages of these advances are reduced keying and/or coding, and readily discernible times for events, and times available for scheduling events.

DISCLOSURE OF THE INVENTION

A unique method of assembling a monthly calendar is provided in order that time related information for an entire month is presented in a readily discernible, interpretable, and understandable manner. The monthly calendar is assembled from both month and day screens. A month screen is built in grid form such that blocks are provided for each day of the month. Included within the blocks are day indications made up of a number of numeric characters appropriate to the month of the screen being built. Surrounding each day indication is blank space for carrying event information which is abbreviated from a corresponding day screen upon assembly of the monthly calendar.

Day screens are built by keying in a date, a time, and an event description which contains information related to the keyed in time. Based on date keying, an appropriate month grid is built. Based on time and event description keying, the first character of the event description is positionally located, time-wise, in the space in the appropriate block. This character is replicated in adjacent positions of the day block as necessary to indicate the duration of the event.

Since the user keys in the event descriptions as part of the chore of building daily calendars, assembling the month screen from the day screens requires no extra information keying. Also, using this method, the user can formulate a preferred systematic approach to describing events on the daily calendar in order for the month screen to be meaningful and understandable.

BRIEF DESCRIPTION OF THE DRAWING

FIG. 1 is a pictorial representation of a monthly calendar screen assembled according to this invention.

FIG. 2 is a pictorial representation of a filled in day screen or daily appointment schedule for one of the days which is used in assembling the calendar of FIG. 1.

BEST MODE FOR CARRYING OUT THE INVENTION

Figure 3:
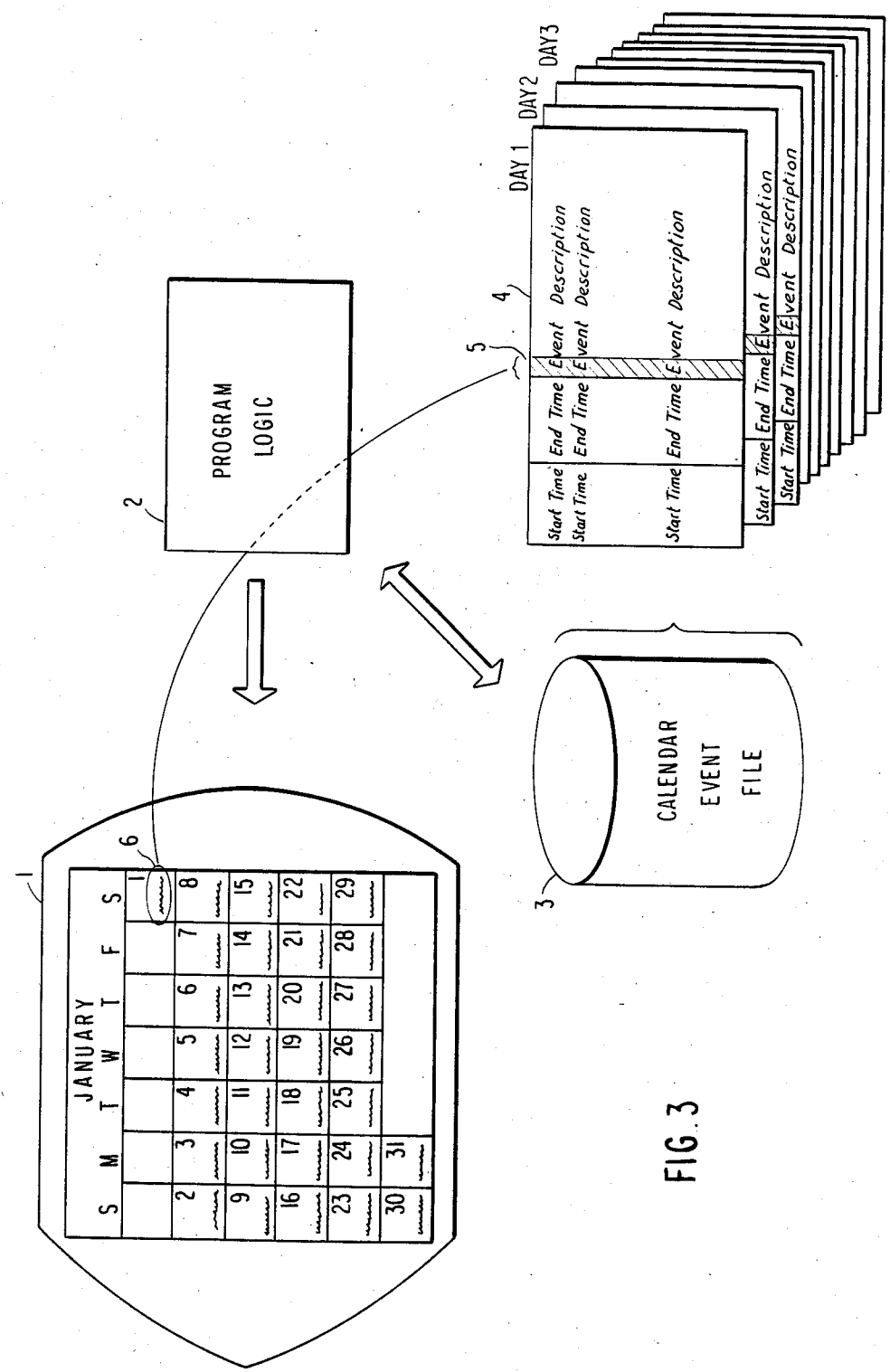
FIG. 3 illustrates a day and month screen relationship, and in general form, the structure of a system for assembling the calendar in FIG. 1.

For a more detailed understanding of the invention, reference is first made to FIG. 1. In this figure, a month screen for July 1983 is depicted in grid form, and is annotated with hourly event abbreviations. The depicted grid is a rectangular array of seven by six day blocks, with Sundays occupying the left column of blocks.

When the whole month is displayed on a display device of at least 24 lines of 80 characters, each day block can be two character rows high and 10 characters wide. Within each day block, numeric characters appear on the top row to indicate the date. On the bottom row, a single character abbreviation can be used to represent each event description. Referring to Thursday, July 21, the "S", positionally located at 10:00 a.m., can be an abbreviation for "Status meeting", and the "I", at 2:00 p.m., can represent "Interview with Ed Smith". To aid the user in identifying in which hour slot a particular event is scheduled, periods are used to indicate unscheduled hours. Each of these periods represent a working hour of the day, assumed here to begin at 9:00 a.m. and end at 5:00 p.m. Without the periods, determining that the "I" is at 2:00 p.m. is subject to error. In each day block, one position of blank space is used to represent times before 9:00 a.m. and another to represent times after 5:00 p.m. Thus, a day with no event scheduled, such as July 3, is displayed with one blank, followed by eight periods, followed by one blank. This corresponds to the 10 characters previously mentioned as available within each day block.

As alluded to above, the hour abbreviation for a particular event is chosen to be the first character of the event description that the user keys in on the day screen. When an event is scheduled for more than one hour, this abbreviation is replicated on the month screen as appropriate to indicate the event's duration. An example of this is illustrated on July 26, where the three "M"s indicate an event, such as a "Meeting with Bill", that is scheduled for three hours.

The month calendar of FIG. 1 is built from day screens and a month template or grid outline with the date indications appropriately located in the blocks for the particular month. Included in the month template are the days of the week which appear along the top of the grid, the name of the screen "Look at the Whole Month" which appears at the top, a help chart which appears at the bottom, the previously described periods, etc.

Referring next to FIG. 2, there is illustrated a filled-in day screen. When initially called, the screen contains all entries with the exception of those immediately under the headings "BEGIN", "END" and "DESCRIPTION". The date opposite "Date" is initially today's date, as determined by a clock. The owner name opposite "Schedule for:" is initially the user. These entries may be changed by the user to other day schedules or other persons' calendars.

By entering times under the BEGIN and END headings, positional locations for event abbreviations in subsequently built month screens are established. For a standard eight hour working period of a day, beginning at 9:00 a.m. and ending at 5:00 p.m., the abbreviations are system selected as the first character of the event note under the DESCRIPTION heading. As such, no extra effort on the part of the user is required to select abbreviations. Since the day, July 19, shown in FIG. 2 has an event that begins before 9:00 a.m., a flagging character, "<", is used in FIG. 1 to replace the normally blank space adjacent the left border of the day block. This is to alert the user that an other than normal schedule has been established. Similarly, a ">" indicates that the day's events will extend beyond 5:00 p.m. The hyphen following the "D" in FIG. 1, is a flagging character used to indicate that the corresponding event is personal or confidential in nature. When the user is someone other than the calendar owner, there is only a need to know that an event is scheduled during the corresponding time.

The "*" on July 19 of FIG. 1 corresponds to the hour between 1:00 p.m. and 2:00 p.m. Since there are two events scheduled during this hour, as illustrated in FIG. 2, the "*" is used as a flagging character instead of the abbreviations for one of those two events.

Reference is next made to FIG. 3. This figure illustrates in general form the structure of the system used in creating the assembled month screen. In response to a keyboard request to assemble and display a month screen on CRT display device 1, program logic 2 reads each of the daily files 4 from mass storage 3 for a given month and extracts the first characters of the event descriptions 5. The first characters are displayed in the appropriate day block 6 of the month screen.

Figure 4:
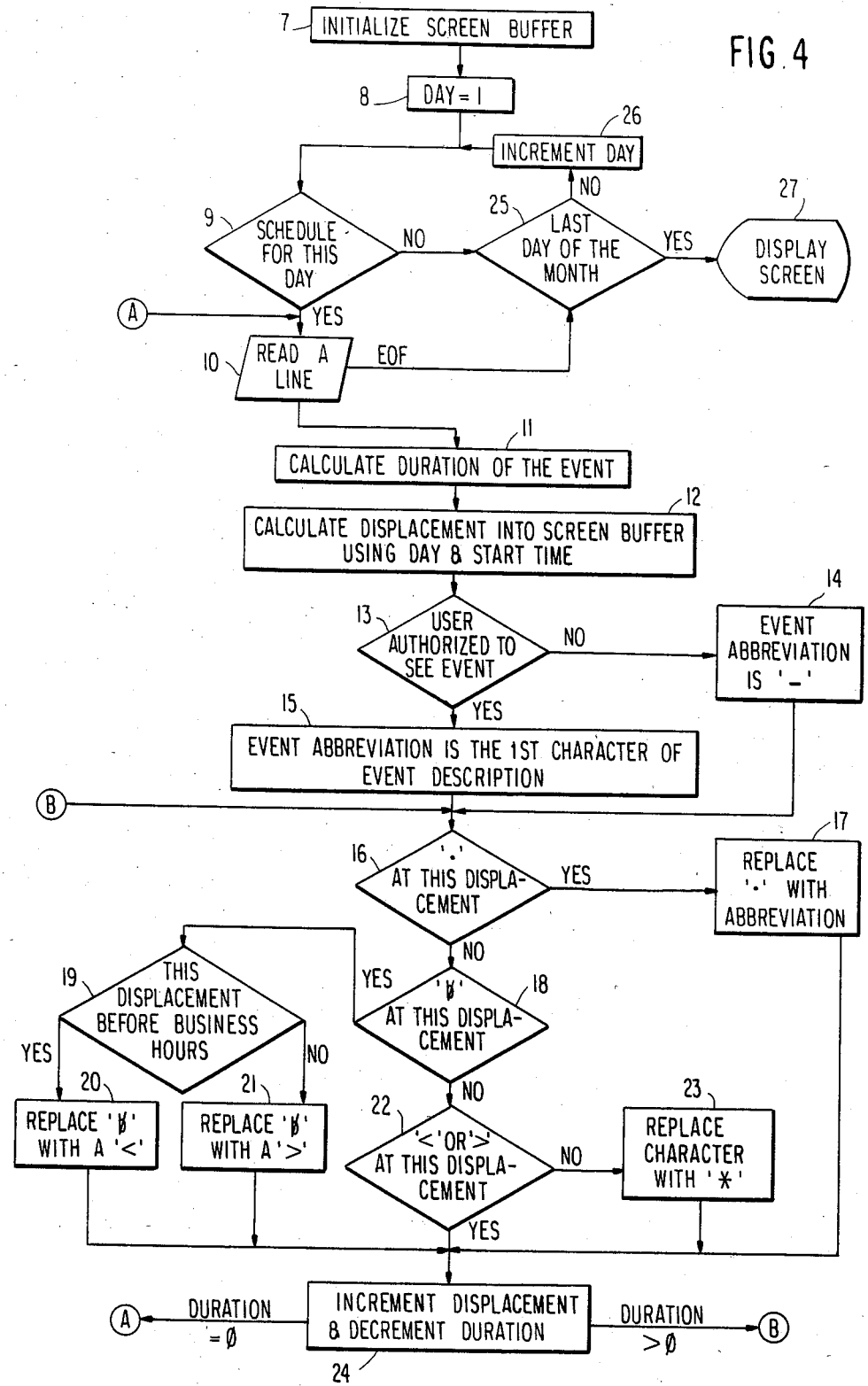
FIG. 4 shows a flow diagram of the software operations performed with the structure of FIG. 3 for assembling the calendar of FIG. 1.

Refer next to FIG. 4 wherein there is illustrated in greater detail the operations performed by program logic 2 of FIG. 3 in assembling the month screen of FIG. 1. First, as indicated by block 7, a screen buffer included in the system of FIG. 3 is initialized as if there are no events scheduled for any day of the month. Next, a counter is set to the first day of the month as indicated in block 8. Then, a determination is made as to whether there are any events scheduled for the current day. This is illustrated by logic sequence 9. If there are events scheduled for this day, a line is read from the daily schedule, as shown by block 10. The duration of the event is calculated by logic sequence 11. Then, using the number of the current day and the start time of the current event, the proper displacement into the screen buffer is calculated, as indicated by block 12. In logic sequence 13, a determination of the user's authorization to view the actual abbreviation of the event is made. If the user is authorized only to know the time of the event, the code for the event abbreviation is set to a hyphen. This is indicated by block 14. If the user is authorized to view the event, the event abbreviation is set to the first character of the event description, as indicated in block 15. Next, a determination is made as to whether the character at the calculated displacement is a period. This is accomplished in logic sequence 16. If it is a period, the period at this displacement is replaced with the selected code. This is indicated by block 17. If there is not a period at the displacement, a determination is made as to whether there is a blank at this displacement. This step is indicated by logic sequence 18. If the character is a blank, a determination is made as to whether this displacement is a position representing the time before business hours represented by the blank at the left border of the current day block. This is performed by logic sequence 19. As indicated by block 20, the blank is replaced with a "<" if the displacement represents the time before business hours. Otherwise, the blank represents the time after business hours, and is replaced by a ">", as indicated by block 21.

If the character at this displacement is not a blank as determined by logic sequence 18, a determination is made as to whether a character at this displacement has already been set to a "<" or a ">". This is indicated by logic sequence 22. If the character is not a "<" or a ">", it is replaced with an "*" to indicate more than one event is scheduled during the hour represented by this displacement. This is indicated by block 23. If the character is a "<" or ">", the character is left as is.

When the character at this displacement is thus set, the displacement is incremented by one, and the duration of the event is decremented by one, as indicated by block 24. If the duration is not yet $\phi$, processing continues at block 16. When the duration becomes $\phi$, processing continues at block 10. When the last line of the current day's event schedule has been processed, a determination is made as to whether the current day is the last day of the month. This determination, which is performed by logic sequence 25, is also made if there are no events scheduled for the current day. If this day is not the last day of the month, the day is incremented so that the following day becomes the current day. This is indicated by block 26. If it is determined by logic sequence 25 that the current day is the last day of the month, then the month screen illustrated in FIG. 1 is displayed to the user, as illustrated by block 27.

In summary, a unique method of assembling a monthly calendar is provided in order that time related information for an entire month is presented in a readily discernible and understandable manner. The monthly calendar is assembled from both month and day screens. A month screen is built in grid form such that blocks are provided for each day of the month. Included within the blocks are day indications made up of a number of numeric characters appropriate to the month of the screen being built. Surrounding each day indication is blank space for carrying event information which is abbreviated from a corresponding day screen upon assembly of the monthly calendar.

Day screens are built by keying in a date, a time, and an event description which contains information related to the keyed in time. Based on date keying, an appropriate month grid is built. Based on time and event description keying, the first character of the event description is positionally located time-wise in the space in the appropriate block. This character is replicated in adjacent positions of the day block as necessary to indicate the duration of the event.

Since the user keys in the event descriptions as part of daily calendars, assembling the month screen from the day screens requires no extra information keying. Also, using this method, the user can define a preferred systematic approach to describing events on the daily calendar in order for the month screen to be meaningful and understandable.

While the invention has been particularly shown and described with reference to a preferred embodiment, it will be understood by those skilled in the art that various changes in form and detail may be made without departing from the spirit and scope of the invention.

We claim:

1. A method of building a readily interpretable monthly calendar, said method comprising:
    (a) keying time related event descriptions for building daily screens;
    (b) building a monthly calendar with days of a month indicated thereon;
    (c) locating the first character of an event description for a day from a daily screen; and
    (d) positioning said first character time-wise relative to a day indication on said monthly calendar.

2. A method according to claim 1 including keying times for said event descriptions when building daily screens.

3. A method according to claim 1 including building a monthly calendar having a grid forming blocks for each day of a month.

4. A method according to claim 3 including dividing each block into a number of time increments.

5. A method according to claim 4 including marking said time increments for which there are no corresponding event descriptions.

6. A method according to claim 5 including providing space before and after a portion of said time increment divided block for indicating before and after working hour events.

* * * * *